United States Patent
Shitamichi

(10) Patent No.: US 6,486,964 B2
(45) Date of Patent: Nov. 26, 2002

(54) MEASURING APPARATUS

(75) Inventor: Yukinaga Shitamichi, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/870,546

(22) Filed: May 30, 2001

(65) Prior Publication Data

US 2001/0043336 A1 Nov. 22, 2001

Related U.S. Application Data

(63) Continuation of application No. PCT/JP99/06662, filed on Nov. 29, 1999.

(30) Foreign Application Priority Data

Nov. 30, 1998 (JP) .............................. 10-339333
Nov. 30, 1998 (JP) .............................. 10-339334

(51) Int. Cl.$^7$ .............................................. G01B 11/24
(52) U.S. Cl. ....................... 356/614; 356/624; 356/625; 356/237.1; 250/234; 250/235
(58) Field of Search ................................ 356/614, 620, 356/622, 624, 625, 630, 634, 636, 237.1, 237.2, 237.3, 237.4, 237.5; 250/234, 235, 572

(56) References Cited

U.S. PATENT DOCUMENTS

| | | | | |
|---|---|---|---|---|
| 4,541,715 A | * | 9/1985 | Akiyama et al. | 356/237.4 |
| 4,922,308 A | * | 5/1990 | Noguchi et al. | 356/237.2 |
| 5,038,048 A | * | 8/1991 | Maeda et al. | 356/614 |

FOREIGN PATENT DOCUMENTS

| | | | |
|---|---|---|---|
| JP | 61-29712 | | 2/1986 |
| JP | 1-123102 | | 5/1989 |
| JP | 02145904 | * | 6/1990 |
| JP | 04013908 | * | 1/1992 |
| JP | 4-301507 | | 10/1992 |
| JP | 5-74686 | | 3/1993 |
| JP | 5-232378 | | 9/1993 |
| JP | 6-249788 | | 9/1994 |
| JP | 7-83845 | | 3/1995 |
| JP | 8-160306 | | 6/1996 |
| JP | 9-113794 | | 5/1997 |
| JP | 9-145314 | | 6/1997 |
| JP | 10-9825 | | 1/1998 |
| WO | WO 97/48968 | | 12/1997 |

OTHER PUBLICATIONS

Japanese Office Action dated Oct. 25, 2001 issued in counterpart Japanese Patent Application No. 338411/99, and English translation thereof.

* cited by examiner

*Primary Examiner*—Frank G. Font
*Assistant Examiner*—Sang H. Nguyen
(74) *Attorney, Agent, or Firm*—Frishauf, Holtz, Goodman & Chick, P.C.

(57) ABSTRACT

The laser beam emitted from a laser diode is applied to a sample, thereby measuring the height of the sample in accordance with the principle of trigonometrical measurement. A line-sensor camera acquires a dark-field image of the sample by using a ring-shaped illumination device, and a bright-field image of the sample by using a light source. The luminance-image data items representing the dark-field image and the bright-field image, respectively, are input to a controller. The position of the sample and the defects in the sample can thereby be detected. The position can be detected and the height can be measured, with high accuracy. This greatly relieves inspectors.

15 Claims, 3 Drawing Sheets

MEASURING APPARATUS

CROSS REFERENCE TO RELATED APPLICATIONS

This is a Continuation Application of PCT Application No. PCT/JP99/06662, filed Nov. 29, 1999, which was not published under PCT Article 21(2) in English.

This application is based upon and claims the benefit of priority from the prior Japanese Patent Applications No. 10-339333, filed Nov. 30, 1998; and No. 10-339334, filed Nov. 30, 1998, the entire contents of both of which are incorporated herein by reference.

BACKGROUND OF THE INVENTION

The present invention relates to an apparatus for measuring the height, position and the like of an object.

In recent years, the integration densities and scales of semiconductor components are ever increasing. Among the semiconductor components are electrical-part packages, such as BGA packages each having electrical components such as bare chips. One type of a BGA package includes bare chips with bumps formed by FC bonding. It is demanded that the position, height and the like of each element incorporated in such a BGA package be measured more accurately than before.

Hitherto, inspectors examine electrical components each having bumps. More precisely, they examine the components one by one, by using microscopes, for the positions and heights of the components.

It takes them much time to examine the outer appearance of each electrical component, however. The efficiency of the examination is inevitably low. Additionally, the examination is cumbersome, which annoy the inspectors greatly.

To acquire high-quality images of samples, it is necessary to adjust the light from the laser diode (i.e., light source) to an optimal intensity.

Some methods have been employed to control the intensity of the laser beam emitted from the laser diode. One method is to change the power-supply voltage applied to the laser diode, thereby to control the intensity of the laser beam. Another method is to arrange in front of the laser diode an ND filter whose transmittance gradually varies and move the ND filter, thereby to control the intensity of the laser beam.

If the power-supply voltage of the laser diode is changed, however, the laser beam will have an unstable wavelength. It will be then difficult to acquire high-quality images. If an ND filter is used, the laser beam cannot have uniform intensity after it has passed through the ND filter. This is because points on a specified cross section of the laser beam that has passed through the ND filter tend to exhibit different intensities.

Another method may be available to control the intensity of a laser beam is available. A polarizing plate is arranged in the path of the laser beam and rotated, thereby to change the intensity of the beam as the beam passes through the plate. However, optimal brightness varies in accordance with the position and condition of measuring the sample. Consequently, it is difficult to acquire a high-quality image at all times.

BRIEF SUMMARY OF THE INVENTION

Accordingly, it is an object of the present invention to provide a measuring apparatus that can perform various measuring processes at high accuracy and within a short time, thereby much relieving inspectors.

It is another object of the present invention to provide a measuring apparatus that can always acquire an image of a sample, which has optimal brightness, even if the position and condition of measuring the sample change.

According to an aspect of the invention, there is provided a measuring apparatus comprising: first measuring means including a measuring light source for emitting a measuring light, an objective lens, provided to oppose a sample, for focusing the measuring light on the sample, scanning means for two-dimensionally scanning a surface of the sample with the measuring light passing through the objective lens, an optical system for guiding a light beam reflected by the sample to a plane on which a pupil of the objective lens is projected and focusing part of the guided light beam, the part of the guided light beam to be focused having an optical axis positioned apart for a distance from that of the guided light beam, optical position detecting means, provided on a plane where the part of the guided light beam is focused by the optical system, for detecting a shift amount of a beam-spot that shifts in accordance with a height of the sample, and height-calculating means for calculating the height of the sample from the shift amount detected by the optical position-detecting means; and second measuring means for receiving through the objective lens a light reflected from or scattered by the sample to which an illumination light is applied from an illumination light source, and thereby acquiring two-dimensional data, wherein the objective lens is provided on a position where an optical axis related to the first measuring means and an optical axis related to the second measuring means overlap each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which.

DETAILED DESCRIPTION OF THE INVENTION

The embodiments of the invention will be described with reference to the accompanying drawings.

An embodiment of the present invention will be described, with reference to the accompanying drawings.

Figure 1:
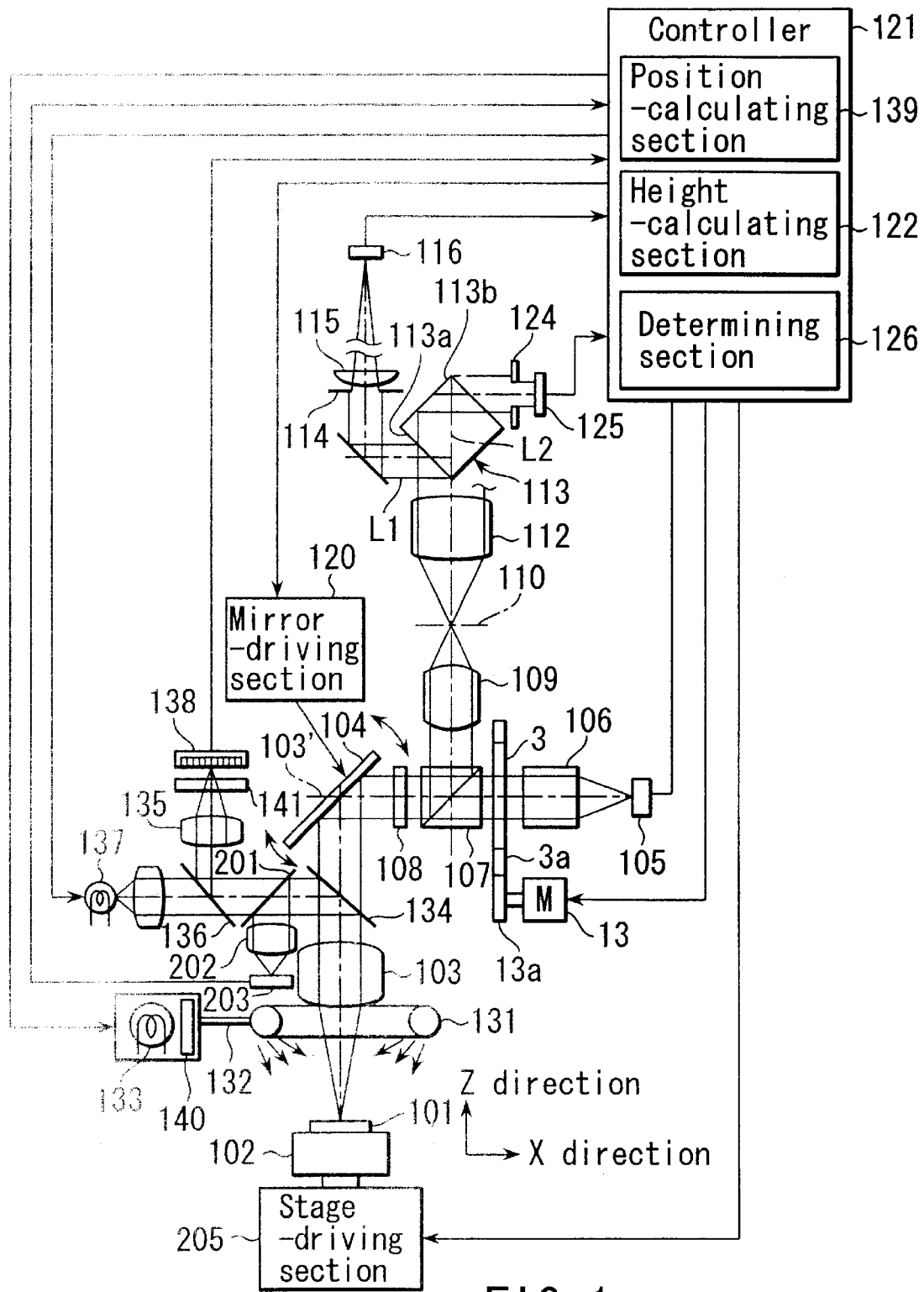
FIG. 1 is a schematic representation of an embodiment of the present invention.

FIG. 1 is a schematic representation of a detecting apparatus according to an embodiment of the present invention. As shown in FIG. 1, a sample 101 is placed on a stage 102.

The stage 102 can move when driven by a stage-driving section 205. The stage 102 can move, whenever necessary, in a Z direction, an X direction and a Y direction (i.e., direction perpendicular to the plane of the drawing).

An objective lens 103 opposes the sample 101 mounted on the stage 102. The objective lens 103 is an object-side telecentric lens of infinite design.

A ring-shaped illumination device 131 is arranged between the stage 102 and the objective lens 103. The ring-shaped illumination device 131 is connected by an optical fiber 132 to a light source 133. It receives light from the light source 133 and applies the same to the sample 101 from the circumference of the objective lens 103, thereby to provide a dark-field image of the sample 101.

A dichroic mirror 134 is arranged between the objective lens 103 and a galvano-mirror 104, which will be described later. A half mirror 136 is placed in the reflection path of the dichroic mirror 134.

A light source 137 is provided in the transmission path of the half mirror 136, to achieve reflected illumination. The light source 137 emits light, which travels through the half mirror 136, dichroic mirror 134 and objective lens 103. The light (i.e., reflected illumination light) is applied to the sample 101. A bright-field image of the sample 101 is thereby acquired.

Figure 2:
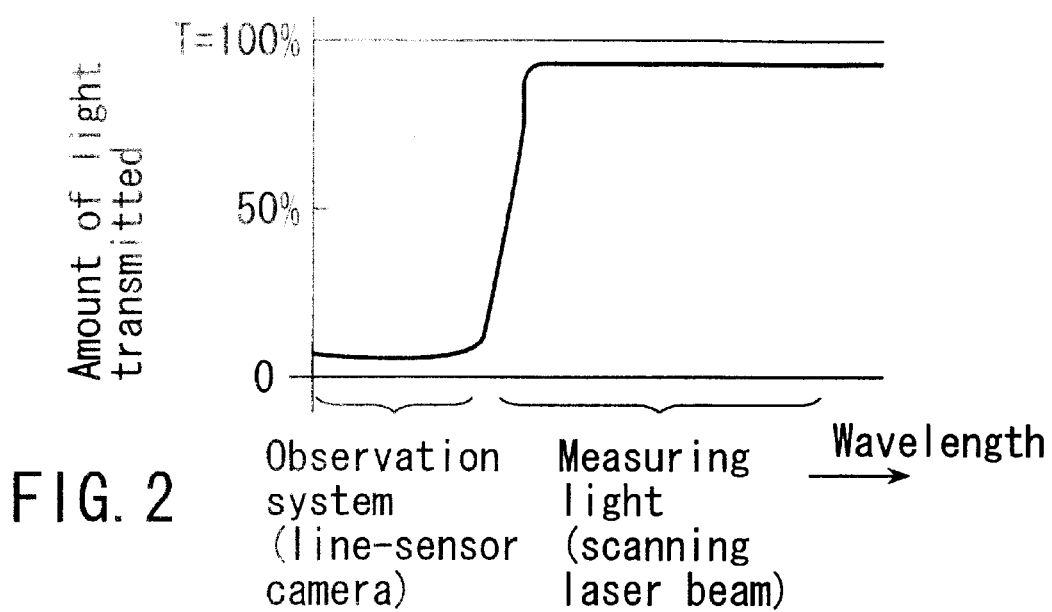
FIG. 2 is a graph illustrating the characteristic of the dichroic mirror incorporated in the embodiment.

As shown in FIG. 2, the dichroic mirror 134 has particular characteristics. That is, it exhibits low transparency (high reflecting power) to the wave region of a system for observing the dark-field image provided by the ring-shaped illumination device 131. It presents low transparency also to the wavelength region of a system for observing the bright-field image provided by the light source 137 (for reflected illumination). It exhibits high transparency (low reflecting power) to the wavelength region of the measuring light emitted from a laser diode 105, which will be described later.

The dark-field image or bright-image of the sample 101 is applied via the objective lens 103 to the dichroic mirror 134. The dichroic mirror 134 reflects the image, and the half mirror 136 reflects the same. The image is then applied via a condenser lens 135 into a line-sensor camera 138 that is located at the position where the image is focused.

That is, the line-sensor camera 138 acquires the dark- or bright-image of the sample 101, which applied to it from the reflection path of the dichroic mirror 134 through the condenser lens 135. In the line-sensor camera 138, the image acquiring position for each line is deviated from the scanning position of the galvano-mirror 104 (later described). The influence of a laser beam is thereby eliminated. Thus, an excellent dark- or bright-field image can be obtained.

The dark-field image the line-sensor camera 138 has acquired is input, as luminance-image data, to the position-calculating section 139 of a controller 121. The position-calculating section 139 finds the position of the sample 101 from the two-dimensional image data acquired by the line-sensor camera 138. The position-calculating section 139 also processes the luminance-image data in accordance with an optimal algorithm concerning illumination or defects, thereby to detect foreign matter, voids or stain in the sample 101 or the size of the sample 101.

The bright-field image the line-sensor camera 138 has acquired is input, as luminance-image data, to the controller 121. The controller 121 processes the luminance-image data supplied from the line-sensor camera 138, in accordance with an optimal algorithm concerning illumination and defects, thereby to detect foreign matter, voids or stain in the sample 101 or the size of the sample 101.

A half mirror 201 is provided between the dichroic mirror 134 and the half mirror 136. This mirror 201 reflects the light of the dark- or bright-field of the sample 101, guiding the same via the condenser lens 135 to a light-receiving element 203. The output of the light-receiving element 203 is input to the controller 121. As shown in the drawing, the half mirror 201 lies on the optical path extending between the dichroic mirror 134 and the half mirror 136. Instead, it may be located on the optical path that extends between the half mirror 136 and the condenser lens 135.

In accordance with the output of the light-receiving element 203, the controller 121 performs feedback control on the light source 133 or the light source 137 such that light intense enough to achieve two-dimensional measuring can be applied (i.e., such that the light can be applied in an amount that falls within a prescribed range (between the lower and upper limits)).

A filter 140 is arranged in front of the light source 133 provided for the ring-shaped illumination device 131. The filter 140 receives the light from the light source 133 and converts the same to single-wavelength light. The dark-field image of sample 101 is thereby efficiently reflected by the dichroic mirror 134 before it is applied into the line-sensor camera 138. The line-sensor camera 138 has a filter 141 provided on its imaging surface. This filter 141 prevents a part of the laser beam emitted from the laser diode 105 (described later) reflected by the surface of the sample 101, from being reflected by the dichroic mirror 134 to enter the line-sensor camera 138.

The galvano-mirror 104 is arranged in the pupil plane 103' of the objective lens 103 and functions as scanning means through the dichroic mirror 134. When driven by a mirror-driving section 120, the galvano-mirror 104 rotates around an axis located near the center of the pupil plane 103' of the objective lens 103. As the mirror 104 rotates, it reflects the measuring light, scanning the surface of the sample 101 in the x direction and the Y direction (i.e., direction perpendicular to the plane of the drawing), both shown in the drawing.

The scanning is accomplished in both the X direction and the Y direction as the galvano-mirror 104 rotates. Alternatively, the Y-direction scanning may be achieved by moving the stage, while the X-direction scanning is effected by rotating the galvano-mirror 104. Conversely, the X-direction scanning may be achieved by moving the stage, while rotating the galvano-mirror 104 performs the Y-direction scanning.

The galvano-mirror 104 is positioned in front of the laser diode 105. A collimate lens 106, a half-wave plate 3, a polarized-beam splitter 107, and a quarter-wave plate 108 are& arranged between the mirror 104 and the diode 105. The collimate lens 106 receives the laser beam from the laser diode 105 and converts the same to parallel light. The parallel light travels through the half-wave plate 3, polarized-beam splitter 107 and quarter-wave plate 108 and is applied to the galvano-mirror 104. The galvano-mirror 104 reflects the light, which passes through the dichroic mirror 134 and objective lens 103. The light, or measuring light, is applied to the surface of the sample 101.

The half-wave plate 3 intersects with the axis of the laser beam emitted from the laser diode 105, almost at right angles (90°). It is desired that the half-wave plate 3 be inclined at 0° to 10° to the axis of the laser beam, not extending exactly at right angles to the axis of the laser beam. This is because the plate 3, if so inclined, prevents that part of the laser beam that has been reflected by the half-wave plate 3, from being applied to the light-emitting section of the laser diode 105. The half-wave plate 3 is a disc and has a gear 3a on its circumferential surface. The gear 3a meshes with the gear 13a mounted on the shaft of a motor 13. Thus, the motor 13 can rotates the half-wave plate 3. The motor 13 is connected to the controller 121. The motor 13 rotates the plate 3 through an angle in accordance with a control signal supplied from the controller 121, thus changing the amount of laser light to be applied via the plate 3.

Figure 3:
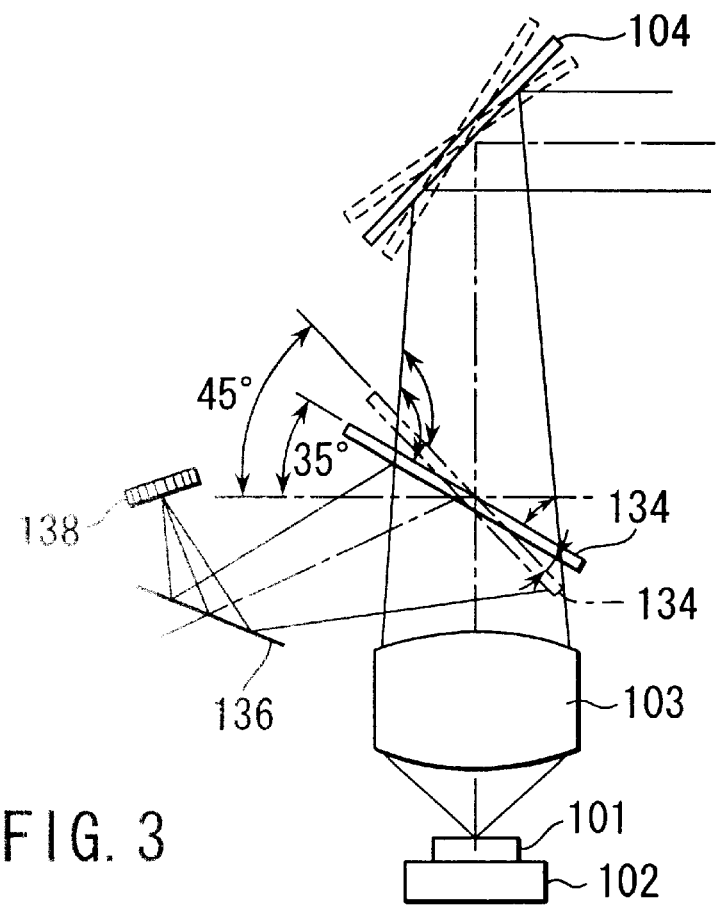
FIG. 3 is a diagram showing the position of the diachronic mirror used in the embodiment.

It is desired that, as shown in FIG. 3, the dichroic mirror 134 be inclined at an angle less than 45° to the plane perpendicular to the optical axis of the objective lens 103 that guides to the surface of the sample 101 the measuring light that has been reflected by the galvano-mirror 104. In the embodiment, the mirror 134 is inclined at 35° as indicated by the solid lines. The angle of incidence is less than 45° with respect to the measuring light. This minimizes the loss of measuring light at the dichroic mirror 134.

The measuring light converges in a telecentric fashion at a given position on the sample 101, as a light beam having a NA that is determined by the pupil diameter and focal distance of the objective lens 103.

The measuring light reflected from the surface of the sample 101 passes through the objective lens 103 and diachronic mirror 134. The galvano-mirror 104 reflects the measuring light. Thereafter, the measuring light passes through the quarter-wave plate 108 and is applied to the polarized-beam splitter 107. The polarized-beam splitter 107 reflects the measuring light. A first condenser lens 109 focuses the light beam on a primary image surface 110.

The light beam passes through the primary image surface 110 and then through a pupil relay lens 112 that serves as a second objective lens of infinite design. The light beam is applied to a prism 113 that has a half mirror surface 113a. At the prism 113, the beam splits into two beams L1 and L2. The beam L1 is reflected from the prism 113. The beam L2 passes through the prism 113.

The light-beam L1 reflected from the half-mirror surface 113a of the prism 113 travels through a first diaphragm 114. A separator lens 115, which is the second condenser lens, focuses the beam L1 on an optical position-detecting element 116 (hereinafter referred to as PSD (Position Sensing Device).

The PSD 116 generates a current signal that varies in accordance with the measuring position S (i.e., beam-spot position). The beam-spot position S shifts to the left or the right for a distance proportional to the change in the height of the sample 101. This accords with the principle of trigonometrical measurement, which will be described later in detail.

The output of the PSD 116 is input to the controller 121 and used as luminance-image data about the bright-field image of the sample 101. It is input to a height-calculating section 122, too. The height-calculating section 122 calculates the height z of the sample 101, i.e., the surface level thereof, from the coordinates x and y (i.e., coordinates in the X and Y directions) and the spot-position signal output from the PSD 116. Note that the coordinates x and y depend on the angle of rotation of the galvano-mirror 104.

The sample 101 may have projections on its surface and recesses in its surface. Then, the beam spot expands to some extent, making accurate measuring impossible. In this case, the PSD 116 detects, but the peripheral part of the beam spot, inevitably making a detection error that is too prominent to neglect.

If this occurs, the height of the sample 101 cannot be detected correctly. It is advisable to discard the result of measuring. In the present embodiment, the light beam L2, which has passed through the half-mirror surface 113a of the prism 113, is guided to a light-receiving element 125 in order to determine whether the sample can be measured. That is, the beam L2 is guided to the element 125 having light-receiving segments, through the mirror surface 113b, i.e., the back of the prism 113, and a second diaphragm 124.

The output of the light-receiving element 125 (i.e., data representing the intensity of light) is input to a determining section 126. From the output of the element 125 the section 126 determines whether the light is intense enough to detect the height of the sample. To be more specific, the section 126 determines whether the intensity of light falls within a prescribed range (between the lower and upper limits).

The controller 121 carries out feedback control on the laser diode 105 in accordance with the output of the light-receiving element 125. Thus controlled, the laser diode 105 emits light having intensity that falls within the prescribed range (between the lower and upper limits). The light is therefore intense enough, making it possible to measure the height of the sample.

More specifically, the controller 121 supplies a control signal to the motor 13, thus driving the same. The motor 13 rotates the half-wave plate 3 through the angle that the control signal designates. The intensity of a laser beam, which can pass through the plate 3, is thereby set at an optimal value. An optimal intensity of laser light travels through the plate 3 and forms a beam spot of most appropriate brightness on the sample 101 placed on the state 102. Hence, the controller 121 can obtain an image of the sample 101 that has been measured while illuminated to an optimal brightness.

The front focal plane of the first condenser lens 109 lies either in the pupil plane of the objective lens 103 or the plane 103' conjugate thereto. By contrast, the separator lens 115 is positioned in the rear focal plane of the pupil relay lens 112 that is the second objective lens. Thus, the separator lens 115 is located at a position conjugate to the pupil plane 103' of the objective lens 103. The separator lens 115 therefore uses that part of the measuring light reflected from all measuring points, which has passed through the same part of the objective pupil plane 103', thereby forming a measuring spot on the PSD 116.

Figure 5:
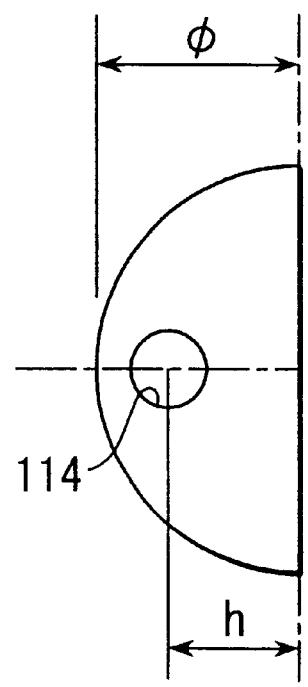
FIG. 5 is a plan view the diaphragm provided at the light-receiving element used in the embodiment.

As illustrated in FIG. 5, the first diaphragm 114 is provided at the peripheral part of the pupil (i.e., at a distance h from the center of the pupil). The spot therefore moves on the PSD 116 in a desired direction due to the projections and recesses of the sample 101, on the basis of the principle of trigonometrical measurement.

The first diaphragm 114 and the second diaphragm 124 that opposes the light-receiving element 125 are placed at positions that are conjugate to each other. Hence, the light beam applied onto the light-receiving element 125 is one composed of the beam applied to the PSD 116 and the beam passed through the same part of the objective pupil plane 103'.

How the embodiment so constructed as described above operates will be described below.

First, the ring-shaped illumination device 131 applies illumination light from the circumference of the objective lens 103 toward the sample 101. The sample 101 reflects the light. The light, which defines a dark-field image, passes through the objective lens 103, is reflected by the dichroic mirror 134 and is further reflected by the half mirror 136. The light then passes through the condenser lens 135, forming an image on the line-sensor camera 138 located at the focal point of the condenser lens 135. The dark-field image acquired by the line-sensor camera 138 is input, as luminance-image data, to the position-calculating section 139 of the controller 121. The controller 121 finds the position of the sample 101, thereby determining the position of the sample 101.

The light source 137 emits illumination light. The illumination light is applied to the sample 101, passing through the half mirror 136, condenser lens 135, dichroic mirror 134 and objective lens 103. The sample 101 reflects the illumination light, which forms a bright-field image. This light passes through the objective lens 103, is reflected by the dichroic mirror 134 and further by the half mirror 136. The light then passes through the condenser lens 135. The line-sensor camera 138, which is located at the focal point of the lens 135, acquires the bright-field image. The bright-field image is input, as luminance-image data, to the controller 121. The controller 121 selects the optimal algorithm concerning the defects in the sample 101. The defects are thereby detected.

Thus, when the ring-shaped illumination device 131 is turned on, the luminance-image data representing a dark-field image of the sample 101 is input to the controller 121, whereby the position of the sample 101 is detected. When the light source 137 is turned on, the luminance-image data representing a bright-field image of the sample 101 is input to the controller 121, whereby the defects in the sample are detected. In either case, the detection can be achieved with high accuracy, reducing detection errors. The ring-shaped illumination device 131 and the light source 137 can be turned on simultaneously, inputting luminance-image data that is a combination of the dark- and bright-field images of the sample 101. In this case, too, it is possible to measure the sample 101 for various items, by processing the luminance-image data in accordance with various algorithms.

The laser diode 105 emits a laser beam, which is applied to the galvano-mirror 104 through the collimate 106, polarized-beam splitter 107 and quarter-wave plate 108. The galvano-mirror 104 reflects the light, which is applied, as measuring light, via the dichroic mirror to the objective lens 103. The objective lens 103 focuses the measuring light on the surface of the sample 101. The sample 101 reflects the measuring light. The light travels through the objective lens 103 and the dichroic mirror 134. The galvano-mirror 104 reflects the light, which is applied via the quarter-wave plate 108 to the polarized-beam splitter 107 and then applied to the first condenser lens 109. The lens 109 focuses the light on the primary image surface 110. The light passes first through the primary image surface 110 and then through the pupil relay lens 112. The light is applied to the prism 113 having half-mirror surface 113a. The light is reflected at the half-mirror surface 113a, forming a beam L1. The beam L1 travels through the mirror 113 and first diaphragm 114 to the separator lens 115. The separator lens 115 focuses the beam L1 on the SPD 116.

The output of the PSD 116, i.e., the luminance-image data that represents the bright-field image of the sample 101, is input to the controller 121. It is input to the height-calculating section 122, too.

The controller 121 measures the various items of the sample 101, in accordance with the luminance-image data about the bright-field image of the sample 101. The height-calculating section 122 calculates the height z of the sample 101, from the coordinates x and y and the spot-position signal output from the PSD 116.

The measuring of the height z may be performed independently. Alternatively, it may be implemented along with the acquisition of the dark- or bright-field image of the sample 101.

The operation of the height-calculating section 122 will be described in detail.

First, the principle of calculating the height of the sample 101 and the method thereof will be explained in detail.

Figure 4:
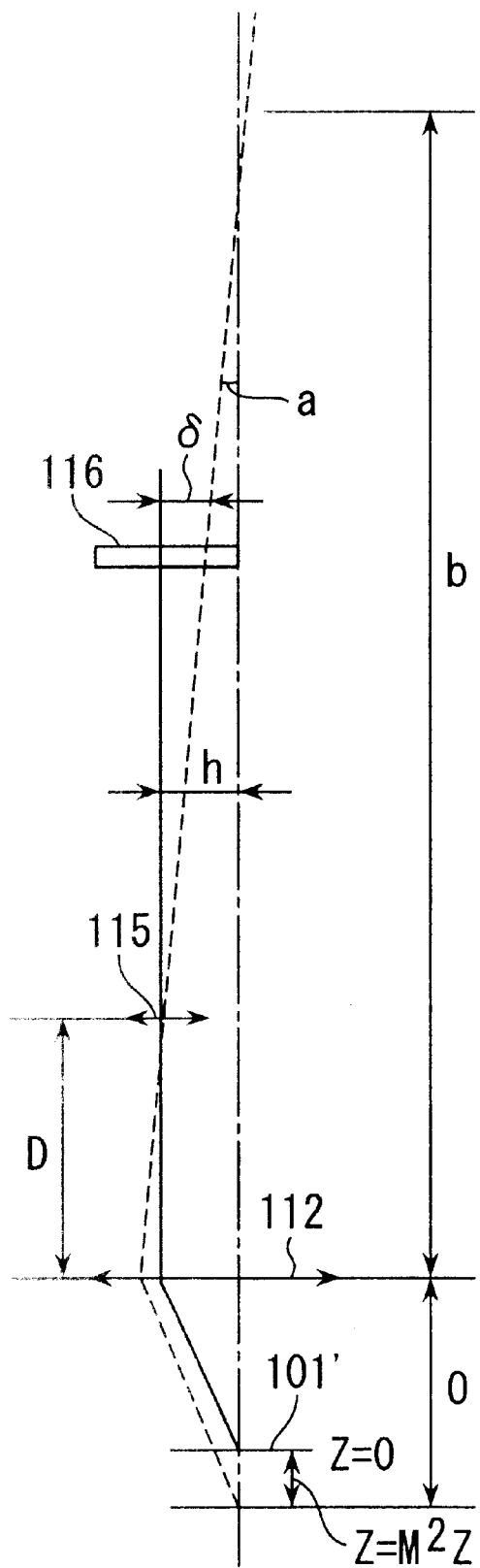
FIG. 4 is schematic diagram explaining the trigonometrical measurement performed in the embodiment.

FIG. 4 shows only those components that lie behind the primary image surface 110 shown in FIG. 1. The image of the sample, which is formed in the primary image surface 110, is regarded as the surface 110' of the sample.

The system parameters applied are the focal distance fp of the pupil relay lens 112 (second objective lens), the focal distance fs of the separator lens 115, the magnification M of the primary image, the height h from the optical axis to the center of the separator lens 115, the distance D between the pupil relay lens 112 and the separator lens 115, and the numerical aperture $NA_{OB}$ of the first condenser lens 109.

The defocusing degree Z' (height) of the primary image is given as $ZM^2$, where Z is the height of the sample 101. A beam spot is formed on the PSD 116, at a distance δ from the center of the PSD 116. As is seen from FIG. 4, the distance is defined as follows:

$$\delta = fs \cdot \tan\alpha \quad (1)$$

$$\tan\alpha = h/(b-D) \quad (2)$$

Therefore:

$$\delta = fs \cdot h/(b-D) \quad (3)$$

$$h = fp \cdot NA_{OB}/MP \quad (4)$$

where P is the ratio (P=ϕ/h) between the center of the diaphragm and the radius of the pupil, which is obtained at the pupil of the condenser lens 109.

Let us find b, as follows:

$$1/b = (1/fp) - (1/(fp+M^2Z)) \quad (5)$$

Hence:

$$b = fp(fp+M^2Z)/M^2Z \quad (6)$$

Combining the above equations, we have the following:

$$\delta = fs \cdot (fpNA_{OB}M/P) \cdot Z \cdot \{1/(fp(fp+M^2Z) - DM^2Z)\} \quad (7)$$

As described above, the pupil relay lens 112 and the separator lens 115 are spaced apart by a distance D, which is fp. Therefore:

$$\delta = (fs/fp) \cdot (NA_{OB}M/P) \cdot Z \quad (8)$$

Thus, δ and Z have a relation that is perfectly linear.

The value actually measured is δ. The equation (8) can therefore be transformed to the following:

$$Z = \{fpP/(fsNA_{OB}M)\} \cdot \delta \quad (9)$$

To calculate the height Z of the sample 101, based on the principle described above, the height-calculating section 122 incorporated in the controller 121 receives a spot-position signal δ from the PSD 116. The height-calculating section 122 uses spot-position signal δ, the system parameters f and the like, and the position data items x and y sequentially supplied from the mirror-driving section 120 and calculates the heights Z at various measuring positions. The heights Z are sequentially output from the section 122.

Thus, height can be measured at a broad area and over a broad dynamic range, at a very high speed, without moving any optical system or the sample 101 up or down.

The height of the surface of the sample 101 can therefore be carried out at high speed thanks to the principle of trigonometrical measurement, by using the measuring light emitted from the laser diode 105. In addition, the line-sensor camera 138 acquires a dark-field image of the sample 101 by using the ring-shaped illumination device 131 or the bright-field image of the sample 101 by using the light source 137. It is therefore possible to measure the position of the sample 101 or detect defects in the sample 101, under the best condition concerning the defects. Thus, various measuring processes, such as height-measuring and position-measuring, can be achieved both accurately and efficiently within a short time. Moreover, the objective lens 103 serves not only as two-dimensional measuring means for providing two-dimensional image data such as a dark-field image or a bright-field image, but also as three-dimensional measuring means that performs trigonometrical measurement (for measuring at least height). A plurality of measuring means can therefore operate without moving the sample 101. As a result, one measuring means can be switched to another, without displacing the sample 101. This much relieves inspectors and eliminates cumbersome adjusting operations.

In the embodiment described above, the half-wave plate 3 lies in front of the laser diode 105 that emits a laser beam. The plate 2 intersects with the laser beam at almost right angles and can rotate. The plate 3 is rotated by the motor 13 by an angle designated by the control signal supplied from the controller 121 to the motor 13. The intensity at which the laser beam passes through the plate 3 is thereby set at a specific value. Therefore, the wavelength of the laser beam does not change as in a conventional apparatus in which the power-supply voltage of the laser diode is changed. High-quality images can thereby be obtained. Further, a laser beam of uniform intensity can be continuously applied, not varying in intensity as in a conventional apparatus that has a DN filter. Thus, a laser beam of uniform intensity can be applied continuously. In other words, stable control of a laser beam is realized.

As has been described, the present invention provides a measuring apparatus that can perform various measuring processes with high accuracy and within a short time, thus much relieving inspectors. Moreover, the provides a measuring apparatus that can always acquire images of optimal brightness, even if the measuring position is changed to another or the measuring condition is altered.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A measuring apparatus comprising:
    first measuring means including:
        a measuring light source for emitting a measuring light,
        an objective lens, provided to oppose a sample, for focusing the measuring light on the sample,
        scanning means for two-dimensionally scanning a surface of the sample with the measuring light passing through the objective lens,
        an optical system for guiding a light beam reflected by the sample to a plane on which a pupil of the objective lens is projected and focusing part of the guided light beam, the part of the guided light beam to be focused having an optical axis positioned apart for a distance from an optical axis of the guided light beam,
        optical position detecting means, provided on a plane where the part of the guided light beam is focused by the optical system, for detecting a shift amount of a beam-spot that shifts in accordance with a height of the sample, and
        height-calculating means for calculating the height of the sample from the shift amount detected by the optical position-detecting means; and
    second measuring means for receiving through the objective lens a light reflected or scattered by the sample to which an illumination light is applied from an illumination light source, and thereby acquiring two-dimensional data,
    wherein the objective lens is provided at a position where an optical axis related to the first measuring means and an optical axis related to the second measuring means overlap each other.

2. The measuring apparatus according to claim 1, wherein the two-dimensional data acquired by the second measuring means contains at least one of luminance-image data items representing a dark-field image of the sample and a bright-field image thereof, respectively.

3. The measuring apparatus according to claim 1, wherein the two-dimensional data acquired by the second measuring means contains luminance-image data items representing a dark-field image of the sample and a bright-field image thereof, respectively.

4. The measuring apparatus according to claim 1, further comprising a dichroic mirror for splitting the light reflected or scattered from the sample into two parts and applying the parts of the light to the first measuring means and the second measuring means, respectively, wherein
    the dichroic mirror has a surface that intersects with an optical axis of the objective lens at an angle less than 45°.

5. The measuring apparatus according to claim 1, wherein the second measuring means includes a line-sensor camera for acquiring a one-dimensional image of the sample, a position of the one-dimensional image on the sample being deviated from a scanning portion of the scanning means on the sample for each scanning line.

6. The measuring apparatus according to claim 5, wherein the second measuring means acquires a dark-field image of the sample or a bright-field image thereof, and wherein
    a height calculation of the sample by the first measuring means and an image acquisition of the sample by the second measuring means are simultaneously executed.

7. The measuring apparatus according to claim 1, wherein the illumination light source includes a reflected illumination light source.

8. The measuring apparatus according to claim 1, wherein the illumination light source includes a light source for emitting an illumination light to provide a dark-field image and a filter for converting the illumination light emitted by the light source to a single-wavelength light.

9. The measuring apparatus according to claim 1, wherein the first measuring means further includes means for acquiring two-dimensional data related to the sample.

10. The measuring apparatus according to claim 1, further comprising means for detecting an intensity of the illumination light reflected, and means for controlling the illumination light in accordance with the intensity detected.

11. The measuring apparatus according to claim 1, further comprising a rotatable wave plate arranged on a path of the measuring light.

12. The measuring apparatus according to claim 11, further comprising drive means for rotating the wave plate and determining an angle at which the wave plate is to be rotated.

13. The measuring apparatus according to claim 12, further comprising means for detecting an intensity of the measuring light reflected, and means for driving the drive means in accordance with the intensity detected, thereby to control the measuring light.

14. The measuring apparatus according to claim 11, wherein the wave plate is inclined at such an angle that the light emitted from the measuring light source and then reflected is not applied to the measuring light source.

15. The measuring apparatus according to claim 11, wherein the wave plate is a half-wave plate.

* * * * *